No. 830,158. PATENTED SEPT. 4, 1906.
A. MAGNUSON.
SYSTEM OF MOTOR CONTROL.
APPLICATION FILED JULY 6, 1905.
2 SHEETS—SHEET 2.
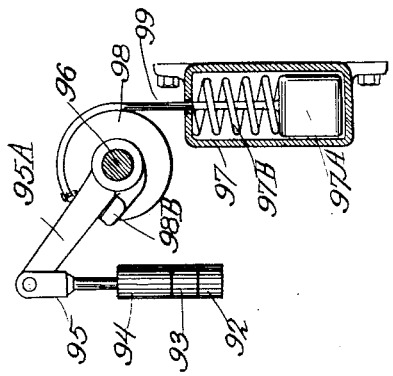
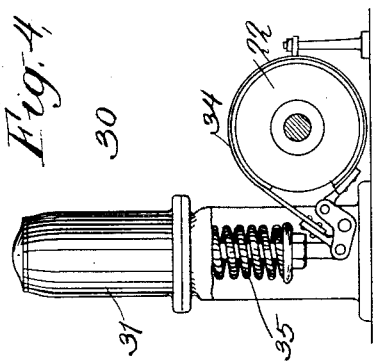
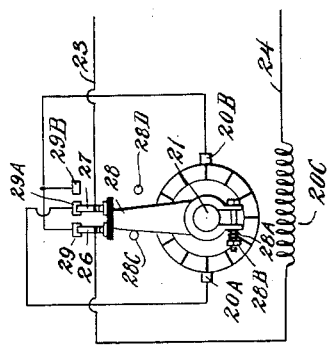
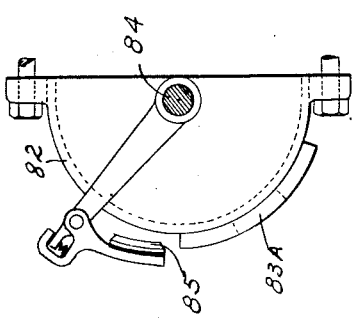
Witness
Joseph E. Cavanaugh
Thomas Foster
Inventor
Axel Magnuson
by E. W. Marshall
Attorney

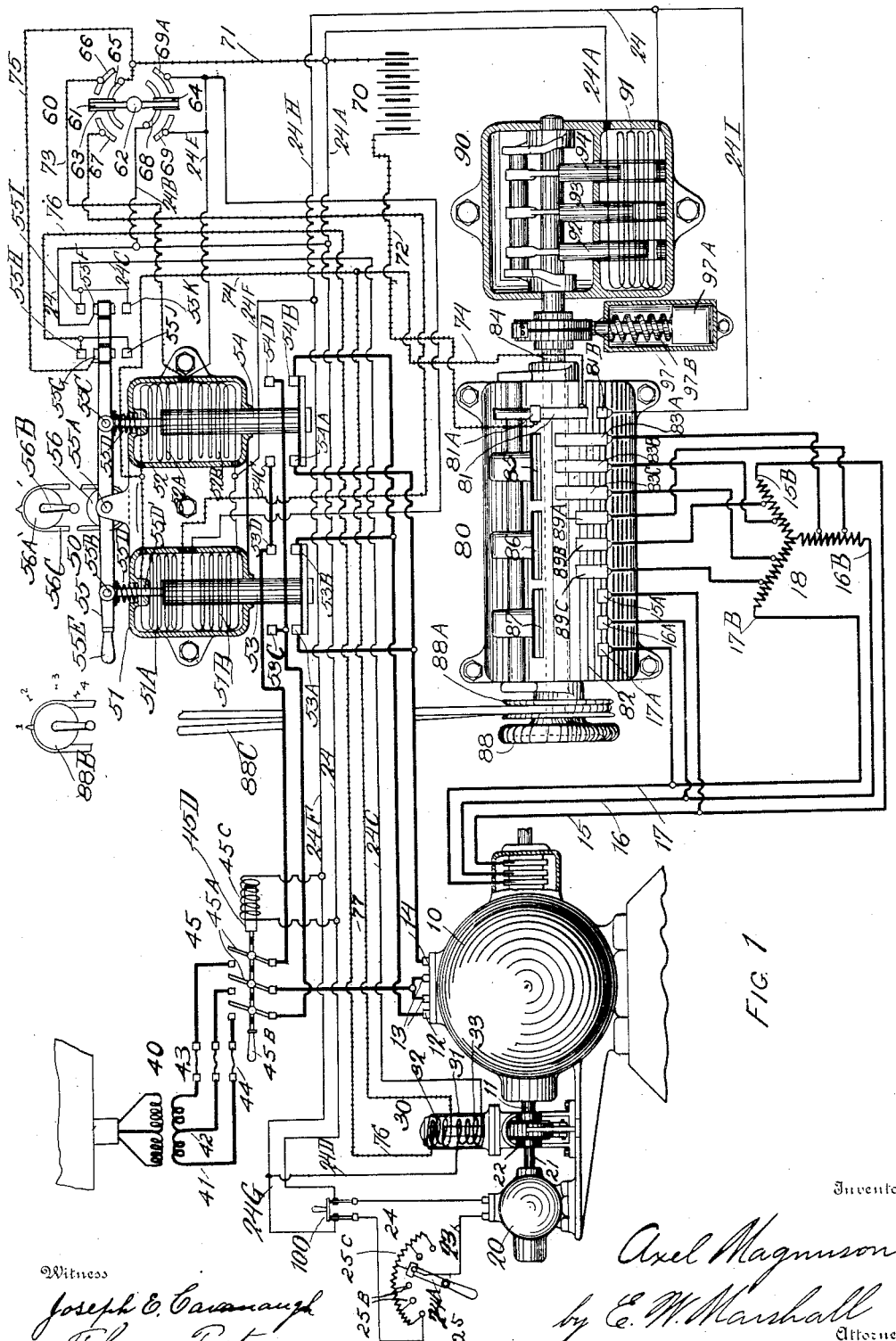

UNITED STATES PATENT OFFICE.

AXEL MAGNUSON, OF NEW YORK, N. Y., ASSIGNOR TO OTIS ELEVATOR COMPANY, OF JERSEY CITY, NEW JERSEY, A CORPORATION OF NEW JERSEY.

SYSTEM OF MOTOR CONTROL.

No. 830,158.      Specification of Letters Patent.      Patented Sept. 4, 1906.

Application filed July 6, 1905. Serial No. 268,592.

*To all whom it may concern:*

Be it known that I, AXEL MAGNUSON, a citizen of the United States, and a resident of New York city, in the county of New York and State of New York, have invented certain new and useful Improvements in Systems of Motor Control, of which the following is a specification.

My invention relates to a system of motor control; and it consists of a novel arrangement of various apparatus and circuits whereby an electric motor may be started, stopped, and otherwise controlled at will.

Although my system is applicable to other types of electric motors, it may be used to great advantage in conjunction with such motors as are operated by alternating currents.

I have made application for Letters Patent, Serial No. 241,592, filed January 18, 1905, for a system of motor control which embodies the broad idea of the present invention, and the present invention is of certain improvements and developments of the invention disclosed in said prior application.

Referring to the drawings, Figure 1 is a diagram of certain apparatus and circuits which show my invention. Fig. 2 is an end view of a detail of a controller or accelerating device. Fig. 3 is a sectional view of an actuator which may be used in connection with the motor-accelerator. Fig. 4 is a side elevation of an electromagnetically-actuated brake, and Fig. 5 is a wiring diagram of a series-generator with means for reversing the armature connections.

Like characters of reference designate corresponding parts in all of the figures.

10 designates an electric motor which is to be controlled. In the drawings it is shown as an alternating-current motor.

20 is a generator connected to run with the motor. It may be directly connected to the motor by having its shaft 21 connected to the motor-shaft 11 by means of a coupling 22, or it may be connected in any other desired manner.

30 is a brake for the motor. It comprises an electromagnet 31, which may be provided with two separate windings 32 and 33. It also comprises a brake-band 34, which is arranged to be tightened about the coupling 22 by means of a spring 35 and released by the magnet 31 in a well-known manner.

40 designates a transformer, the primary of which may be connected to a suitable source of electrical supply and its secondary connected to various parts of the apparatus by means of the mains 41, 42, and 43, which pass through fuses 44 and a main switch 45.

50 designates an electromagnetically-actuated reversing-switch for starting the motor in either direction. It comprises two magnets 51 and 52, each of which is provided with two energizing-coils $51^A$ $51^B$ and $52^A$ $52^B$.

53 designates the core for magnet 51, and 54 the core for magnet 52. Connected to but insulated from these cores are certain movable contacts $53^A$ $53^B$ and $54^A$ $54^B$. Above these movable contacts are stationary contacts $53^C$ $53^D$ and $54^C$ $54^D$. The main 41 is connected to contacts $53^D$ and $54^C$, and the main 43 is connected to contacts $53^D$ and $54^C$. Contacts $53^B$ and $54^B$ are connected to motor-terminal 12, and contacts $53^A$ and $54^A$ are connected to motor-terminal 14. When magnet 51 is energized and raises its core 53, contacts $53^A$ and $53^B$ will be closed against contacts $53^C$ and $53^D$, and thereby the main 41 will be connected to motor-terminal 14 and main 43 will be connected to motor-terminal 12. The main 42 is connected to the central motor-terminals 13, and therefore the motor will receive current from the line and will begin to rotate in one direction. When magnet 52 is energized and lifts its core and its connected contacts, the mains 41, 42, and 43 will thereby be connected to motor-terminals 12, 13, and 14, respectively. The motor will then receive current from the line in the other direction and will rotate in the other direction.

Before pointing out the electromagnetic means for actuating this reversing-switch or starting-switch 50 I will show how it may be actuated by hand. An actuating-lever 55 is situated above the magnets 51 52 and is pivoted between them, as at $55^A$. This lever is mechanically attached at $55^B$, by means of a rod $55^{D'}$, to the magnet-core 53 and similarly attached at $55^C$ to magnet-core 54. One end of this lever 55 may be provided with a handle $55^E$. It is evident that the cores 53 and 54 and the contacts they control may be actuated in the desired direction by a movement of the lever 55, and, if desired, the electromagnetic means may be so designed as to be inoperative to close the switch; but after it is closed manually, as described, the electromagnetic means may be effective to hold said switch closed, or the manual means for closing the reversing-switch may be entirely independent of the electromagnetic means in its operation. A wheel or pulley 56 may be attached to the lever 55, and this may be connected to a similar wheel 56$^A$ by means of a chain or belt 56$^C$. The second wheel, which may be placed at any desired distance from the reversing-switch 50, may be provided with a handle 56$^B$, by means of which and the mechanism just described the reversing-switch may be manually operated from a distance. Springs 55$^D$ may be provided to bring the lever 55 back to central position when released. The lever 55 carries at one end two contacts 55$^F$ and 55$^G$, which are arranged to be moved against stationary contacts 55$^H$ 55$^I$ or 55$^J$ 55$^K$ whenever the lever 55 is moved either by hand or by the magnets 51 52. These contacts control certain electrical contacts, which will be pointed out later.

70 designates a storage battery which is connected to various parts of the apparatus in a manner which will be specifically described presently.

60 is a manually-operated master-switch, by means of which the motor may be controlled through the intermediate agency of other devices. This master-switch comprises a contact-arm 61, which is pivoted at 62 and which carries two contact-plates 63 and 64. When the arm 61 is moved to the right, its contact-plate 63 bridges and electrically connects two stationary contacts 65 and 66, and thereby completes a circuit from the battery 70 through conductors 71 73, magnet-winding 52$^A$, conductor 74, contacts 81 and 81$^B$ on a controlling device, (which I will describe more in detail later,) and conductor 72 back to the battery 70. The battery-circuits are shown by light lines with dots upon them. It will be seen, then, that magnet 52 will be energized by the battery-current, and it will raise its core 54, with its connected contacts. This will cause the motor 10 to rotate in one direction, as I have already shown. It will also cause the lever 55 to be moved so that its contact 55$^G$ will be closed against contact 55$^H$. This will close a circuit through conductors 71 75 76, brake-magnet coil 32, and conductors 77 74, contacts 81 and 81$^A$, and conductor 72 to the battery. The battery-current will then energize the brake-magnet, and it through its connected mechanism will release the brake 30. At the same time contact 55$^F$ on lever 55 will be closed against contact 55$^I$. Contact 55$^F$ is connected to the generator 20 by one of its mains 24, and a circuit will now be closed through this main 24, conductor 24$^C$, brake-magnet coil 33, conductors 24$^D$ 24$^G$, resistance 25$^C$, and main 23 back to the generator. Thus the brake-coil 33 will be connected across the generator.

When the arm 61 was moved to the right, its contact-plate 64 closed a circuit between stationary contacts 68 and 69 from the generator 20 through its main 24, conductors 24$^B$ 24$^E$, magnet-coil 52$^B$, conductors 24$^F$ 24$^G$, resistance 25$^C$, and main 23, to the generator. Thus the magnet-coil 52$^B$ is connected across the generator. As the motor rotates it drives the connected generator, and the latter will generate a voltage proportional in strength to the speed of the motor. Its generated current will coöperate with the battery-current to energize magnet 52 and the brake-magnet 30. The strength of the generated current may be regulated at will by means of a regulating-switch 25. This comprises a pivoted arm 25$^A$, which is arranged to be moved across a series of contacts 25$^B$, to which the resistance 25$^C$ is connected. By moving the arm 25$^A$ more or less of this resistance may be inserted in the generator-circuit. A cut-out switch 100 may also be provided to make or break the generator-circuit at will.

I will now describe the motor accelerator or controller 80. This is a barrel or drum switch of a common type, which comprises a rotatable base 82, upon which are mounted a number of electrical contacts, such as 83$^A$ 83$^B$ 83$^C$. This base may be rotated about a shaft 84 in such a manner as to bring its connected contacts under and in contact with certain stationary brushes 85 86 87. This may be accomplished directly by hand by means of a hand-wheel 88 or from a distance by hand by means of a hand-wheel 88$^B$, which is connected to another wheel or pulley 88$^A$ on the shaft 84 by means of a belt or chain 88$^C$. This movement of the base 82 may also be accomplished by means of a magnetic actuator 90, which may be constructed as shown in the drawings. It is there shown as comprising a solenoid-coil 91, in which are several magnetic cores 92, 93, and 94. These cores are preferably of different lengths and are placed in different positions within the coil 91. They may be connected to a shaft 96 by means of rods 95, arms 95$^A$, mounted loosely on the shaft, and stop-pieces 98$^B$, rigidly attached to the shaft. Means may be provided to hold these cores in raised position when the coil 91 is not excited. I have shown a weight 97$^A$ and a spring 97$^B$ within a casing 97 and attached to a pulley 98 on shaft 96 by means of a strap 99 for this purpose. The shaft 96 of the actuator may be directly connected to the shaft 84 of the accelerator.

I will now describe the operation of this device. The coil 91 is connected directly across the generator through the main 24, conductor 24$^A$, and main 23, conductors 24$^G$, 24$^F$, and 24$^H$. As the generator is driven by the motor it will send a current through this coil 91 which will be proportional in strength to the speed of the motor. Consequently the coil 91 will exercise an increasing pull on the cores 92, 93, and 94 as the motor accelerates. As core 92 is placed farthest within the coil 91, it will be the first to respond to its influence. It will move the shaft 96 a certain amount and at the same time will cause the cores 93 and 94 to be moved farther into the coil 91. The core 93 will then be in position to respond to a further increase of magnetic pull, which the coil will have as soon as the motor has speeded up a certain degree. This will pull the core 93 farther within the influence of the magnetic lines of the coil 91, and when the coil 91 is sufficiently excited it will pull the core 94 down. Thus it will appear that as the excitation of coil 91 increases the shaft 96 of the actuator will be moved step by step in one direction and through its connected mechanism will cause the motor-accelerator 80 to be correspondingly moved step by step. This operation may be reversed by weakening the current in coil 91, when the weight 97$^A$ and the spring 97$^B$ will cause the shaft 96 and its connected parts to move step by step in the opposite direction.

I will now refer again to the motor-accelerator 80 and will point out that when it has been moved one step, either by hand or by the actuator 90, its brushes 85 will connect and short-circuit the contacts 83$^A$, 83$^B$, and 83$^C$. The second step of its movement is arranged to short-circuit a similar set of contacts 89$^A$, 89$^B$, and 89$^C$ by means of the stationary brush 86. Similarly the third step of its movement will cause the contacts 15$^A$, 16$^A$, and 17$^A$ to be short-circuited by the stationary brush 87. An opposition element 18 may be connected in the motor-circuit. This opposition element may be resistance, inductance, or any other desired arrangement to prevent the starting-current of the motor from being too great. It is shown as a star-connected resistance, the ends of which, 15$^B$, 16$^B$, and 17$^B$, are connected to the rotor of the motor 10 by means of conductors 15, 16, and 17. Intermediate points on the resistance are connected to contacts mounted upon the base 82 of the accelerator or controller 80, as shown, and the apparatus is so arranged that when the accelerator is moved step by step as the speed of the motor increases, as already described, the resistance will be short-circuited step by step. This is a desired operation, as the resistance will thus be cut out of the motor-circuit in proportion to the acceleration of the motor. At the same time the accelerator has been moved its last step, so that its stationary brush 87 electrically connects contacts 15$^A$, 16$^A$, and 17$^A$, and the stationary contact or brush 81$^A$ will run off of contact 81, which is mounted upon the base 82, and will run onto another contact 81$^B$, which is also mounted upon the base 82. This will break the circuit between conductors 72 and 74, and will thus cut off the battery-current from magnet 52 and brake-magnet 32. This may be done automatically by the current from the generator acting upon the coil 91 of the actuator. When the generator-current has attained sufficient strength to accomplish this, it is also strong enough to energize magnets 52 and 32 without the coöperation of the battery-current. This is simply a matter of adjustment. One of the generator-mains 24 is connected to one side of the battery 70 through conductors 24$^A$ and 71. The other generator-main 23 is connected through resistance 25$^C$, conductors 24$^G$, 24$^F$, 24$^H$, and 24$^I$ to the contact 81$^B$. Now when contacts 81$^A$ and 81$^B$ are together the generator-main is thereby connected to the battery 70 through conductor 72. The generator 20 will thus charge the battery during the subsequent running of the motor. To accomplish this, the generator-current should always flow in one direction regardless of the direction of rotation of the generator. Fig. 5 shows an arrangement for reversing the connections of the generator when its direction of rotation is reversed, so that its generated current will always flow in one direction. In this view, Fig. 5, an arm 28 is shown, the lower end of which is supported by the armature-shaft 21 and is pressed against the shaft by a spring 28$^A$, the tension of which may be adjusted by a nut 28$^B$. The other end of the arm carries two contact-pieces 26 and 27, which are insulated from each other and from the arm 28. The outgoing conductor 23 is connected to contact-piece 27, and contact-piece 26 is connected to one end of the series field 20$^C$. The other outgoing conductor is connected to the other end of the series field. Contact-pieces 26 and 27 rest upon stationary contacts 29 and 29$^A$, respectively, as shown, or else upon stationary contacts 29$^A$ and 29$^B$, respectively. The armature-brush 20$^A$ is connected to stationary contact 29$^A$, and the armature-brush 20$^B$ is connected to the other two stationary contacts 29 and 29$^B$. When the motor 10 drives the shaft 21 to the left, the arm 28 and contact-pieces 26 and 27 will remain in the position shown with arm 28 resting against a stop 28$^C$; but when the shaft 21 is rotated to the right the arm 28 and the contact-pieces will be carried over thereby until the arm reaches the stop 28$^D$, when contact-piece 26 will rest upon stationary contact 29$^A$ and contact-piece 27 will rest upon stationary contact 29$^B$. This will cause a reversal of connections between the armature and fields and will cause the generated current to flow in the same direction through the fields of the generator and its outgoing conductors regardless of the direction of rotation of the shaft 21.

At 45 in Fig. 1 I have shown an arrangement for cutting off the current from the motor should its speed become excessive. A main switch having pivoted arms $45^A$ is arranged to be closed by hand by means of a handle $45^B$. A magnetic core $45^D$ is also connected to these pivoted arms and is placed within a solenoid-coil $45^C$. This coil is connected across the generator by being connected to the main 24 and to the conductor $24^F$, which is connected to the other main. The parts may be so adjusted that when the voltage of the generator becomes excessive on account of the motor running too fast the coil $45^C$ will attract the core $45^D$, and thus pull open the main switch.

I have described the operation of this system for operating the motor in one direction. If the pivoted arm 61 of the motor-switches is brought back to center, it will break the controlling-circuits, and thus cut off current from the motor and the brake and cause the motor to stop. If the arm 61 had been moved to the left instead of to the right, so that its contact-plate 63 bridged contacts 65 and 67 and its contact-plate 64 bridged contacts 68 and $69^A$, the operation would have been similar; but in this case magnet 51 would have been energized and the motor would rotate in the opposite direction. This reverse operation can of course be obtained by hand.

This system is capable of many applications and may be used to control various types of motors. The battery maintains the current at a practically constant value for starting the controlling system, and the variable voltage is used to automatically control the acceleration of the motor. Furthermore, after the motor has attained full speed, and consequently the generator's voltage has reached considerable strength, its current is not only used to maintain the various apparatus in the desired positions, but is also used to charge the storage battery. I believe that I am the first to connect a generator to a motor and to use the current from such generator to control all the movements of the motor.

In electric railroad or elevator systems or in other cases where it is desired to control the movements of motors from a distance this system is of great value. This is because mechanical means are provided to supplement the electrical means for operating the motor. This is a safeguard, as the operator will always be able to control the motor, even if the electrical operating devices should not be in working order.

I have shown the magnetic actuator connected to an accelerator or controlling device which controls the acceleration of the motor through the intermediate agency of a resistance or other opposition element. It may be connected to any other suitable arrangement or apparatus for controlling the motor, which apparatus may be different with the various types of motor used. It is also obvious that two or more motors may be controlled simultaneously from one master-switch.

What I claim is—

1. In a system of motor control, a motor, a battery, three sources of current-supply, one of which is led to the motor, another of which is generated by the movement of the motor, and the third of which is in said battery and is derived from said second source of supply, said three sources of supply adapted to control the motor.

2. In a system of motor control, a motor, a starting-switch therefor, one source of electrical supply adapted to actuate the starting-switch, a second source of current-supply adapted to drive the motor, and a third source of current-supply adapted to automatically control the acceleration of the motor.

3. In a system of motor control, a motor, a reversing-switch therefor, one source of current-supply adapted to actuate the reversing-switch, a second source of current-supply adapted to drive the motor, and a generator driven by the motor and arranged to generate a variable current proportional in strength to the speed of the motor, said variable current being arranged to control the acceleration of the motor in proportion to its strength.

4. In a system of motor control, a motor, a battery, a starting-switch for the motor, a current-supply derived from said battery for actuating the starting-switch, a source of current-supply adapted to drive the motor, and a generator driven by the motor and arranged to generate a current, said current arranged to charge the battery.

5. In a system of motor control, a motor, a battery, a reversing-switch for the motor, a current-supply derived from said battery for actuating the starting-switch, a source of current-supply adapted to drive the motor, and a generator driven by the motor and arranged to generate a current, said current arranged to control the acceleration of the motor and to charge the battery.

6. In a system of motor control, a motor, a brake, a battery, a starting-switch for the motor, a current-supply derived from said battery for actuating the starting-switch and the brake, a source of current-supply adapted to drive the motor, and a generator driven by the motor and arranged to generate a current, said current arranged to charge the battery.

7. In a system of motor control, a motor, a battery, a starting-switch for the motor, a current-supply derived from said battery for actuating the starting-switch, a source of current-supply adapted to drive the motor, a generator driven by the motor and arranged to generate a current, said current arranged to charge the battery, and a manually-operated switch arranged to control the battery-current.

8. The combination with a motor, of a controlling system therefor, a generator connected to run with the motor, an additional source of current, and means dependent upon said generator and said additional source of current for operating said controlling system.

9. The combination with a motor, of a controlling system therefor, a primary source of current dependent upon the motor, a secondary source of current dependent upon said primary source, and means operated entirely by the current from said sources for operating said motor-controlling system.

10. The combination with a motor, of a controlling system therefor comprising a starting-switch, a generator connected to run with the motor, an additional source of current, and connections between said generator and said additional source of current and said motor-controlling system.

11. The combination with a motor, of a controlling system therefor, a generator connected to run with the motor, a secondary source of current dependent upon said generator, and means operated by the current from said generator and secondary source of current for operating said controlling system.

12. The combination with a motor, of a controlling system therefor, comprising an electromagnetic actuator, a generator connected to run with the motor, an auxiliary source of current, and connections between the generator, auxiliary source of current and said controlling system.

13. The combination with a motor, of a controlling system therefor comprising a starting-switch, a generator connected to run with the motor, a secondary source of current, connections between the controlling system, generator, and secondary source of current, and a manually-operated circuit-closer for said generator.

14. The combination with a motor, of a controlling system therefor comprising an electromagnetic actuator, a primary source of current dependent upon the motor, a secondary source of current dependent upon said primary source, means operated entirely by the current from said sources for operating said motor-controlling system, and a switch for closing the circuit of the generator.

15. The combination with a motor, of a controlling system therefor comprising a brake, a generator connected to run with the motor, an additional source of current dependent upon said generator, and a manually-operated circuit-closer for said generator.

16. The combination with a motor, of a controlling system therefor, a generator connected to run with the motor, a secondary source of current dependent upon said generator, and circuits and connections to effect the operation of said controlling system by current from said generator constant in value at starting but variable in strength in proportion to the speed of the motor for the further operation of the controlling system.

17. The combination with a motor, of a controlling system therefor, a generator connected to run with the motor to produce current constant in value in starting the controlling system but variable in strength in proportion to the speed of the motor for the further operation of the controlling system, and a secondary source of current dependent upon said generator.

18. A motor, a controlling system therefor, a generator connected to run with the motor, said controlling system arranged to be operated by the current generated by said generator, said current being constant in value in starting the controlling system but variable in strength in proportion to the speed of the motor for further operation of the controlling system, and means for maintaining the current at constant value in starting the controlling system.

19. A motor, a generator connected to run with the motor, a brake for the motor, an electrical circuit for the brake, magnetically-actuated starting-switches, and means operated by said starting-switches for controlling the circuit for the brake.

20. A motor, a generator connected to run with the motor, a brake for the motor, an electrical circuit for the brake, manually-actuated starting-switches, and means operated by said starting-switches for controlling the circuit for the brake.

21. A motor, a generator connected to run with the motor, a battery in circuit with said generator, a magnetically-actuated reversing-switch for the motor, two circuits for said magnetic means, one of which is arranged to be connected to the battery and the other of which is connected to the generator.

22. A motor, a generator connected to run with the motor, a battery in circuit with said generator, a magnetically-actuated reversing-switch for the motor, two circuits for said magnetic means, one of which is arranged to be connected to the battery and the other of which is connected to the generator, and means for automatically cutting off the battery when the current of the generator reaches a desired strength.

23. A motor, a generator connected to run with the motor, a battery in circuit with said generator, a magnetically-actuated reversing-switch for the motor, two circuits for said magnetic means, one of which is arranged to be connected to the battery and the other of which is connected to the generator, and a manually-operated circuit-closer to control both of said circuits.

24. A motor, a generator connected to run with the motor, a reversing-switch for the motor, magnets for actuating the reversing-switch, two circuits for said magnets, two sources of direct-current supply for said circuits, one of which is constant in value and the other of which varies in strength in proportion to the speed of the motor.

25. A motor, a generator connected to run with the motor, a reversing-switch for the motor, magnets for actuating the reversing-switch, two circuits for said magnets, two sources of direct-current supply for said circuits, one of which is constant in value and the other of which varies in strength in proportion to the speed of the motor, and a manually-operated circuit-closer for controlling both of said sources of supply.

26. The combination with a motor, of a generator connected to run with the motor, a brake for the motor, a secondary source of current, and circuits and connections to effect the operation of said brake entirely by the current from said generator and secondary source of current.

27. A motor, a generator connected to run with the motor, a brake for the motor, two windings for said brake, one winding arranged to be energized by a direct current of practically constant value to release the brake and the other winding arranged to be energized by a direct current of variable voltage proportional in strength to the speed of the motor to hold the brake in released position.

28. A motor, a generator connected to run with the motor, a brake for the motor, two windings for said brake, one winding arranged to be energized by a direct current of practically constant value to release the brake and the other winding arranged to be energized by a direct current of variable voltage proportional in strength to the speed of the motor to hold the brake in released position, and means for cutting off said first current when said second current has reached a desired strength.

29. A motor, a generator connected to run with the motor, a brake for the motor, two windings for said brake, one winding arranged to be energized by a direct current of practically constant value to release the brake and the other winding arranged to be energized by a direct current of variable voltage proportional in strength to the speed of the motor to hold the brake in released position, and manually-operated means for controlling both currents.

30. A motor, a generator connected to run with the motor arranged to generate a current proportional in strength to the speed of the motor and to control the acceleration of the motor, and manually-operated means for varying said generated current at will.

31. A motor, a controlling device therefor, a generator connected to run with the motor arranged to generate a current proportional in strength to the speed of the motor and to control the said controlling device, and manually-operated means for varying said generated current at will.

32. A motor, a controlling device therefor, a generator connected to run with the motor, arranged to generate a current proportional in strength to the speed of the motor and to control said controlling device, and manually-operated means for rendering said generated current operative or inoperative.

33. In a motor-controlling system, a motor, a source of electrical energy connected to the motor, a generator connected to run with the motor, and arranged to generate a current proportional in strength to the speed of the motor, and magnetic means in circuit with said generator arranged to disconnect the source of supply from the motor, when the motor reaches an excessive speed.

34. A motor, a generator connected to run with the motor, and a switch comprising contacts and circuit-closers for the motor, said switch adapted to be manually operated, and a magnetic actuator mechanically connected to said switch, and electrically connected to the generator.

35. A motor, a generator connected to run with the motor, and a switch comprising contacts and circuit-closers for the motor, said switch adapted to be manually operated, and a magnetic actuator mechanically connected to said switch, and electrically connected to the generator and arranged to be operated by the current of the generator in proportion to the speed of the motor.

36. A motor, a generator connected to run with the motor, and a switch comprising contacts and circuit-closers for the motor, said switch adapted to be manually operated, and a magnetic actuator mechanically connected to said switch, and electrically connected to the generator and arranged to be operated by the current of the generator step by step in proportion to the speed of the motor.

37. A motor, a magnetically-actuated starting-switch for the motor, a manually-operated circuit-closer for the starting-switch, a generator connected to run with the motor, and a switch comprising contacts and circuit-closers for the motor, said switch adapted to be manually operated, and a magnetic actuator mechanically connected to said switch, and electrically connected to the generator.

38. A motor, a manually-operated reversing-switch for the motor, a generator connected to run with the motor, an accelerating device for the motor, a magnetic actuator mechanically connected to the accelerating device and electrically connected to the generator, arranged to be operated by the current of the generator in proportion to the speed of the motor.

39. A motor, a generator connected to run with the motor, and a switch comprising contacts and circuit-closers for the motor, said switch adapted to be manually operated from a distance, and a magnetic actuator mechanically connected to said switch, and electrically connected to the generator.

40. A motor, a reversing-switch for the motor, means for manually operating said reversing-switch from a distance, a generator connected to run with the motor, an accelerating device for the motor, a magnetic actuator mechanically connected to the accelerating device and electrically connected to the generator, and means for manually operating the accelerating device from a distance.

41. A motor, a reversing-switch for the motor, means for electrically operating said reversing-switch from a distance, additional means for manually operating said reversing-switch from a distance, a generator connected to run with the motor, an accelerating device for the motor, a magnetic actuator mechanically connected to the accelerating device and electrically connected to the generator, and means for manually operating the accelerating device from a distance.

42. A motor, a generator connected to run with the motor, a controlling device for the motor, a magnetic actuator comprising one coil and a series of cores, said actuator being mechanically connected to the controlling device and with its coil electrically connected to the generator and arranged to be operated step by step by the current of the generator in proportion to the speed of the motor.

43. A motor, a generator connected to run with the motor, a controlling device for the motor, a magnetic actuator comprising one coil and a series of cores, said actuator being mechanically connected to the controlling device and with its coil electrically connected to the generator and arranged to be operated step by step by the current of the generator in proportion to the speed of the motor in one direction, and means for operating the controlling device in the opposite direction.

44. A motor, a generator connected to run with the motor, a controlling device for the motor, a magnetic actuator comprising one coil and a series of cores of different lengths and set in different positions within said coil, said actuator being mechanically connected to the controlling device and with its coil electrically connected to the generator and arranged to be operated step by step by the current of the generator in proportion to the speed of the motor.

45. A motor, a generator connected to run with the motor, a controlling device for the motor, a magnetic actuator comprising one coil and a series of cores, said actuator being mechanically connected to the controlling device and with its coil electrically connected to the generator and arranged to be operated step by step by the current of the generator in proportion to the speed of the motor and to thereby store up power which power is arranged to operate the controlling devices in the opposite direction.

46. A motor, a generator connected to run with the motor, a controlling device for the motor, a magnetic actuator comprising one coil and a series of cores, said actuator being mechanically connected to the controlling device and with its coil electrically connected to the generator and arranged to be operated step by step by the current of the generator in proportion to the speed of the motor in one direction, and means comprising a spring in which power is stored up by the movement of the actuator for operating the controlling device in the opposite direction.

47. A motor, a generator connected to run with the motor, a battery, magnetically-actuated switches for the motor, said switches being actuated by current from the battery and held by current from the generator, a controlling device for the motor, a magnetic actuator mechanically connected to the motor-controlling device and electrically connected to the generator, said controlling device comprising contacts which control the battery and generator-currents.

48. A motor, a generator connected to run with the motor and arranged to generate a current proportional in strength to the speed of the motor, a battery, magnetically-actuated switches for the motor, two sets of operating-circuits for said switches, one of which sets is arranged to be energized by current from the battery and the other of which is arranged to be energized by current from the generator, a controlling device for the motor, a magnetic actuator mechanically connected to the motor-controlling device and electrically connected to the generator, and means actuated thereby for automatically cutting off the battery-circuits when the current of the generator reaches a predetermined strength.

49. A motor, a generator connected to run with the motor and arranged to generate a current proportional in strength to the speed of the motor, a battery, magnetically-actuated switches for the motor, two sets of operating-circuits for said switches, one of which sets is arranged to be energized by current from the battery and the other of which is arranged to be energized by current from the generator, a controlling device for the motor.

a magnetic actuator mechanically connected to the motor-controlling device and electrically connected to the generator, and means actuated thereby for automatically cutting off the battery-circuits when the current of the generator reaches a predetermined strength and for connecting the battery to the generator.

In testimony whereof I have signed my name to this specification in the presence of two subscribing witnesses.

AXEL MAGNUSON.

Witnesses:
 JOSEPH E. CAVANAUGH,
 ERNEST W. MARSHALL.